United States Patent [19]
Sugimoto

[11] Patent Number: 5,850,541
[45] Date of Patent: Dec. 15, 1998

[54] DATA PROCESSING APPARATUS HAVING A CLOCK CONTROL UNIT FOR DECREASING POWER CONSUMPTION OF A CENTRAL PROCESSING UNIT

[75] Inventor: Hideki Sugimoto, Tokyo, Japan

[73] Assignee: NEC Corporation, Tokyo, Japan

[21] Appl. No.: 790,805

[22] Filed: Jan. 30, 1997

Related U.S. Application Data

[63] Continuation of Ser. No. 561,332, Nov. 21, 1995, abandoned.

[30] Foreign Application Priority Data

Nov. 21, 1994 [JP] Japan .................................... 6-311200

[51] Int. Cl.⁶ ..................................................... G06F 1/04
[52] U.S. Cl. ........................................... 395/560; 395/309
[58] Field of Search .................................. 395/555, 559, 395/560, 750.04, 306, 309

[56] References Cited

U.S. PATENT DOCUMENTS

| | | | |
|---|---|---|---|
| 5,151,986 | 9/1992 | Langan et al. | 395/550 |
| 5,155,812 | 10/1992 | Ehlig et al. | 395/275 |
| 5,201,036 | 4/1993 | Yoshimatsu | 395/325 |
| 5,371,880 | 12/1994 | Bhattacharya | 395/550 |
| 5,448,744 | 9/1995 | Eifert et al. | 395/800 |
| 5,452,434 | 9/1995 | MacDonald | 395/550 |

FOREIGN PATENT DOCUMENTS

| | | | |
|---|---|---|---|
| 0 432 575 | 11/1989 | European Pat. Off. | G06F 13/42 |
| 0 579 369 | 1/1994 | European Pat. Off. | G06F 1/32 |
| 0 642 837 | 11/1994 | European Pat. Off. | G06F 1/32 |
| 61-103727 | 7/1986 | Japan | G06F 1/04 |
| 62-191960 | 8/1987 | Japan | G06F 13/42 |
| 4-60859 | 2/1992 | Japan | G06F 13/42 |

Primary Examiner—Dennis M. Butler
Attorney, Agent, or Firm—Young & Thompson

[57] ABSTRACT

In a CPU comprising a CPU section and a BCU section, the processing speed of the CPU section is prevented from decreasing, the amount of power consumed by the CPU section is reduced, and the need of a wait control function in the CPU section is eliminated. A clock control section 105c distributes an externally supplied clock 111 to the inside of a CPU section 101 and a BCU section 105. During a read access request from the CPU section 101 to a storage device 106, the period of a CPU clock 112 supplied to the CPU section 101 is extended. That is, the state immediately before the change point of the CPU clock 112 when the CPU section 101 inputs input data via an internal data bus 104 is extended until read data has been established on the internal data bus 104.

3 Claims, 8 Drawing Sheets

DATA PROCESSING APPARATUS HAVING A CLOCK CONTROL UNIT FOR DECREASING POWER CONSUMPTION OF A CENTRAL PROCESSING UNIT

This application is a continuation of application Ser. No. 08/561,332, filed Nov. 21, 1995, now abandoned.

BACKGROUND OF THE INVENTION

1. Field of the Invention

The present invention relates to a data processing apparatus, and in particular, to a data processing apparatus operative during an access to an external storage device or peripheral device to provide wait control according to the response speed of the device to be accessed.

2. Description of the Prior Art

In general, when data is passed between a CPU and an external storage device or a peripheral device, the CPU must provide wait control according to the response speed of the device. Such wait control is generally provided by constantly supplying a clock to the CPU and during a bus cycle for accessing the storage device or the peripheral device, having the CPU sample a ready signal from the device to be accessed at the rising or falling edge of the clock and insert wait states into the bus cycle until the device becomes ready. This method, however, still has a problem in terms of the amount of power consumed by the CPU because the clock is supplied to the CPU as usual even during wait control. Thus, the following improved techniques have conventionally been proposed.

Figure 7:
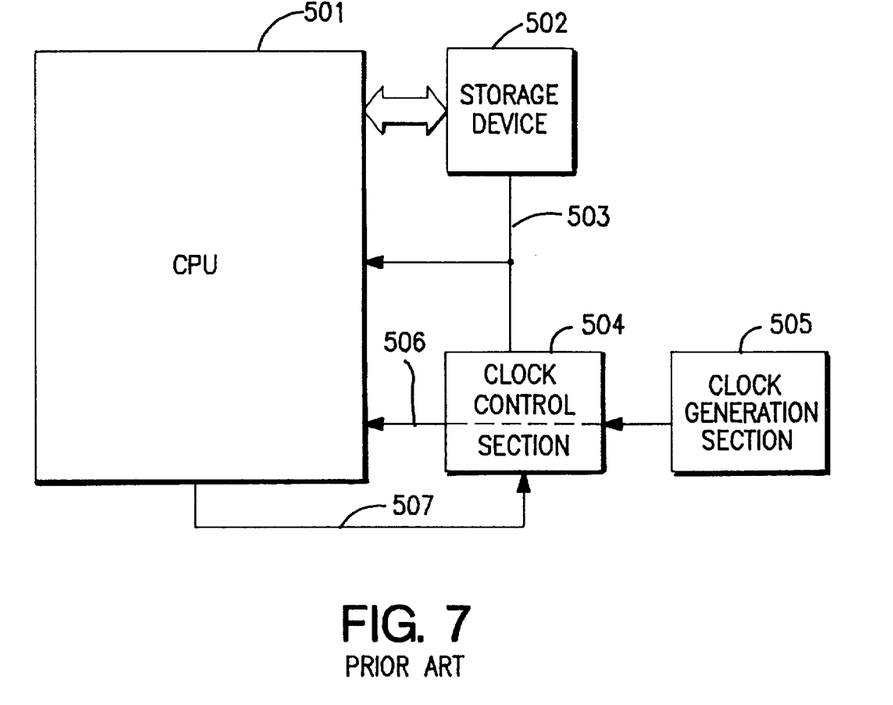
FIG. 7 is a block diagram of the prior art.

One of such techniques is to supply the clock for the CPU until a ready signal from the device to be accessed becomes active (hereafter referred to as a "first prior art") as described in Japanese Patent Laid Open No. 4-60859. FIG. 7 is a block diagram of this technique. A clock generated by a clock generation section 505 passes through a clock control section 504, and is supplied to a CPU 501 as a clock 506. When the CPU 501 starts a bus cycle for accessing a storage device 502, a bus cycle start signal 507 indicating the start of the bus cycle is provided to the clock control section 504, which then maintains the clock 506 to be supplied to the CPU 501 at a low or high level from the point of time when the bus cycle 507 has been initiated until a ready signal 503 from the storage device 502 becomes active. Once the ready signal 503 has become active, the clock 506 is supplied as usual. This causes the CPU 501 to be completely stopped during the period of time when wait states are inserted, to initiate operation when the supply of the clock 506 is started again, and to end the bus cycle when detecting that the ready signal 503 has become active.

This first prior art enables the CPU to be completely stopped until the ready signal from a device to be accessed becomes active, thereby reducing the amount of power consumed by the CPU.

Figure 8:
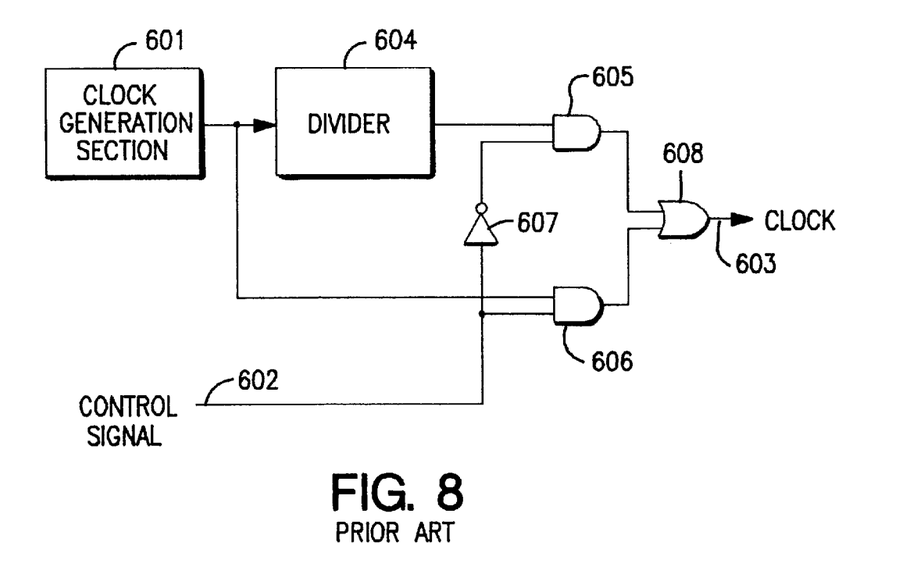
FIG. 8 is a block diagram of the prior art.

A second conventional technique is to switch to a slower clock during a wait mode instead of stopping the clock (hereafter referred to as a "second prior art") as disclosed in Japanese Patent Laid Open 61-103727. FIG. 8 shows a block diagram of this technique. A clock generated by a clock generation section 601 is supplied to the CPU via gates 606, 608 as a clock 603. When the CPU enters a wait mode by starting a bus cycle for accessing an external storage device, a control signal 602 output by the CPU closes the gate 606, while output from a gate 607 causes a gate 605 to be opened. A divider 604 then divides the clock from the clock generation section 601, and the divided clock is supplied to the CPU via the gates 605, 608 as the clock 603.

Although the second prior art cannot completely stop the CPU during wait states, it can somewhat reduce the amount of power consumed because the slower clock is supplied during this period of time.

Figure 9:
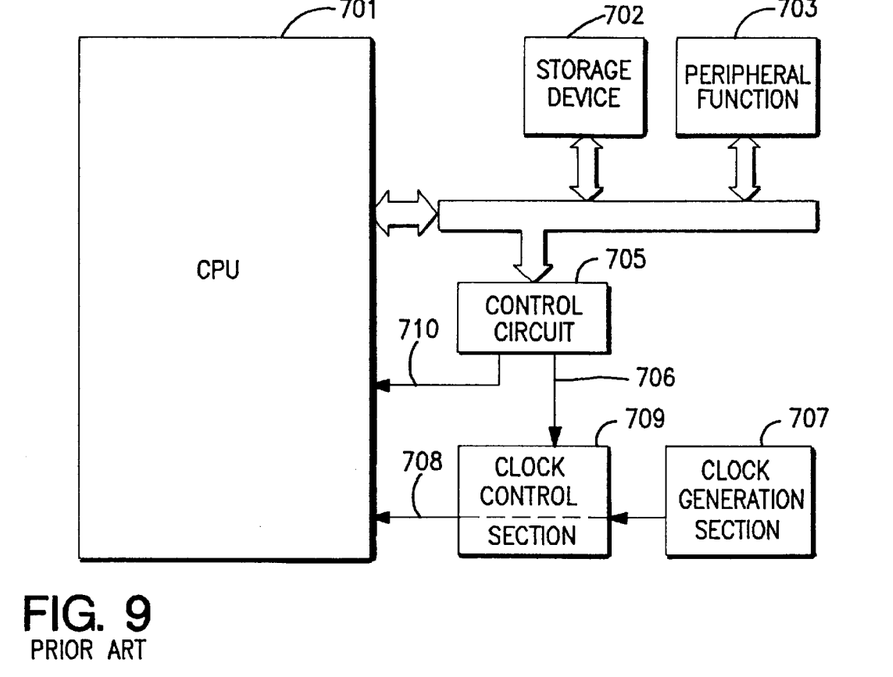
FIG. 9 is a block diagram of the prior art.

A third conventional technique is to switch the clock speed of the CPU according to the speed of a device to which an access request is issued (hereafter referred to as a "third prior art") as disclosed in Japanese Patent Laid Open No. 62-191960. FIG. 9 shows a block diagram of this technique. A clock generated by a clock generation section 707 usually passes through a clock control section 709, and is supplied to a CPU 701 as a CPU clock 708. When the CPU 701 starts a bus cycle for accessing a storage device 702 or a peripheral function 703, a control circuit 705 references the clock speed and number of waits for each device which are stored inside the control circuit 705 in advance with the address of the device, based on the address of a device to be addressed which is output on an external bus 704, in order to determine a clock speed and the number of waits appropriate to the current bus cycle. The clock speed determined is communicated to a clock control section 709 via a clock speed control line 706, and the clock control section 709 correspondingly changes the clock speed of a clock 708 for the CPU 701. A wait number control line 710 for the CPU 701 is controlled according to the number of waits determined.

The main purpose of the third prior art is to eliminate the need to provide a ready signal delivery function in each of the storage device 702 and the peripheral function 703. If the clock speed is reduced according to the device to be accessed, the amount of power can be reduced because the CPU 701 operates at a lower speed during this period of time. Since the CPU 701 must detect the state of the wait number line 710 corresponding to a ready signal line in order to determine whether or not a bus cycle has been ended, the clock for the CPU 701 cannot be completely stopped.

The above techniques for reducing the amount of power consumed by a CPU that requires wait control according to the response speed of a device to be accessed have conventionally been proposed, and have been effective for some types of CPUs. None of the above techniques, however, have not been applicable to those CPUs which comprise a CPU section for operating on data and a BCU section for controlling data inputs and outputs between the CPU section or an external storage device or peripheral device, wherein during a write access to the external device, the CPU section can continue operation after passing write data to the BCU section without the need to wait until the access has been finished, thereby improving the processing speed.

That is, if the first prior art is applied, the clock for the CPU is stopped and the operation of the internal CPU section is thus stopped whether the bus cycle may be associated with a read access or even a write access. In addition, if the second or third prior art is applied, the clock for the CPU is not completely stopped, and the internal CPU section can continue operation. Since the clock is switched to a slower one, the processing speed is reduced compared to usual operation.

Figure 10:
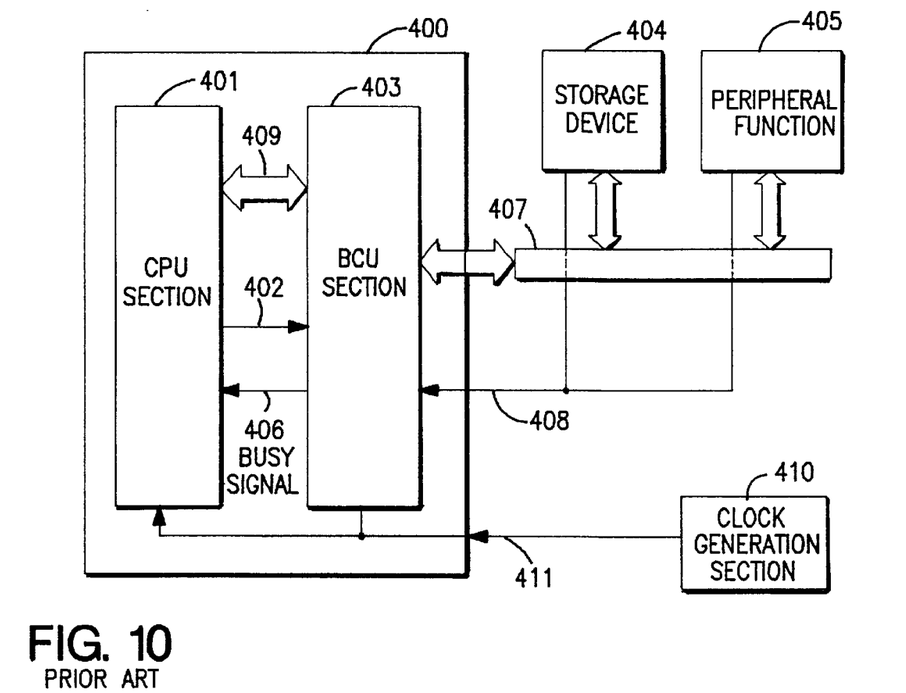
FIG. 10 is a block diagram of the prior art.

For the above reason, the configuration shown in FIG. 10 has been used for the above CPU comprising the CPU and BCU sections in order to provide wait control.

In FIG. 10, a CPU 400 includes a CPU section 401 and a BCU section 403 which are connected via an internal bus 409 comprising an internal address bus and an internal data bus. The BCU section 403 is connected to a storage device 404 and a peripheral function 405 via an external bus 407 comprising an external address bus, an external data bus, and an external control bus. A clock 411 generated by a clock generation section 410 is input to a CPU 400 and constantly supplied to the internal CPU section 401 and BCU section 403.

If data is to be read from the storage device 404 or the peripheral function 405, the CPU section 401 issues a read request to the BCU section 403 using an access request signal 402, and outputs to the internal address bus the address of a device to be accessed. In response to the access request signal 402 from the CPU section 401, the BCU section 403 activates a write bus cycle for the storage device 404 or the peripheral function 405 to be accessed, and simultaneously activates a busy signal 406 for the CPU section 401. The CPU section 401 waits until the busy signal 406 becomes inactive. The storage device 404 or the peripheral function 405 to be accessed executes an access request from the BCU section 403 to output data to the external bus 407 and to activate the ready signal 408. The BCU section 403 has already sampled the state of the ready signal 408 during the write bus cycle state, and provides wait control by inserting wait states if the ready signal 408 is not active. Upon detecting that the ready signal 408 has become active, the BCU section 403 latches the data output by the accessed device to the external bus 407, transfers it to the internal bus 409, and inactivates the busy signal 406 to end the write bus cycle. The CPU 401 detects this, and receives the data from the internal bus 409 to end the read access.

If data is to be written to the storage device 404 or the peripheral function 405, the CPU section 401 issues a write request to the BCU section 403 using the access request signal 402, and outputs data and the address of a device to be accessed to the internal data bus and the internal address bus, respectively. Upon receiving the request, the BCU section 403 activates a read bus cycle on the external bus 407 to process the address request. In this case, however, the busy signal 406 remains inactive. The CPU section 401 thus need not wait after passing write data to the BCU section 403, and can end the write access to continue other operations. The storage device 404 or the peripheral function 405 to be accessed receives the data from the external bus 407 according to the write bus cycle from the BCU section 403 to activate the ready signal 408. The BCU section 403 has already sampled the state of the ready signal 408 during the write bus cycle state, and provides wait control by inserting wait states if the ready signal 408 is not active. Upon detecting that the ready signal 408 has become active, the BCU section ends the write bus cycle.

In this manner, the CPU that comprises a CPU section and a BCU section and eliminates the need of wait control during a write access to improve the processing speed has failed to reduce the amount of power consumed by the CPU during wait control for a read access. This type of CPU requires a wait control function in the BCU section as well as a wait control function corresponding to the busy signal in the CPU section.

BRIEF SUMMARY OF THE INVENTION

This invention is proposed in view of these circumstances, and the object of this invention is to provide a CPU comprising a CPU section and a BCU section, as described above, which can reduce the amount of power consumed by the CPU section while preventing the processing speed of the CPU section from decreasing and which eliminates the need of a wait control function in the CPU section.

To achieve the above the above object, this invention provides a data processing apparatus comprising a CPU section for operating on data and a BCU section for controlling data inputs and outputs between the CPU section and external devices, the BCU section connected to the CPU section via an internal bus and to the external device via an external bus and having functions of generating a bus cycle on the external bus in response to an access request from the CPU section and generating wait states during the bus cycle according to the response speed of the external device to be accessed, including a clock control section within the BCU section, the clock control section supplying an externally supplied clock to the inside of the CPU section and the BCU section, and only during a read access request to the external device from the CPU section, extending the state immediately before the change point of the clock when the CPU section inputs via the internal bus input data corresponding to the read access request, until the input data has been established on the internal bus.

In the data processing apparatus according to this invention, when the CPU section attempts to access an external device, the BCU section generates a bus cycle on the external bus and also generates wait states during this bus cycle according to the response speed of the device to be accessed, based on a ready signal from the device to be accessed and the number of wait states stored in advance. During a write access, the clock control section supplies a clock to the CPU section as usual, while during a read access, it extends the state immediately before the change point of the clock when the CPU inputs via the internal bus input data corresponding to the read access request, until the BCU section outputs to the internal bus data read from the external device. If, for example, data is read from the internal bus at the rising edge of the clock subsequent to the clock when the CPU has issued a read access request, the clock control section extends the low level that has existed immediately before the rising edge of the clock subsequent to the clock when the CPU has issued a read access request, until the input data has been established on the internal bus.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENT

Next, an embodiment of this invention is described in detail with reference to the drawings.

Figure 1:
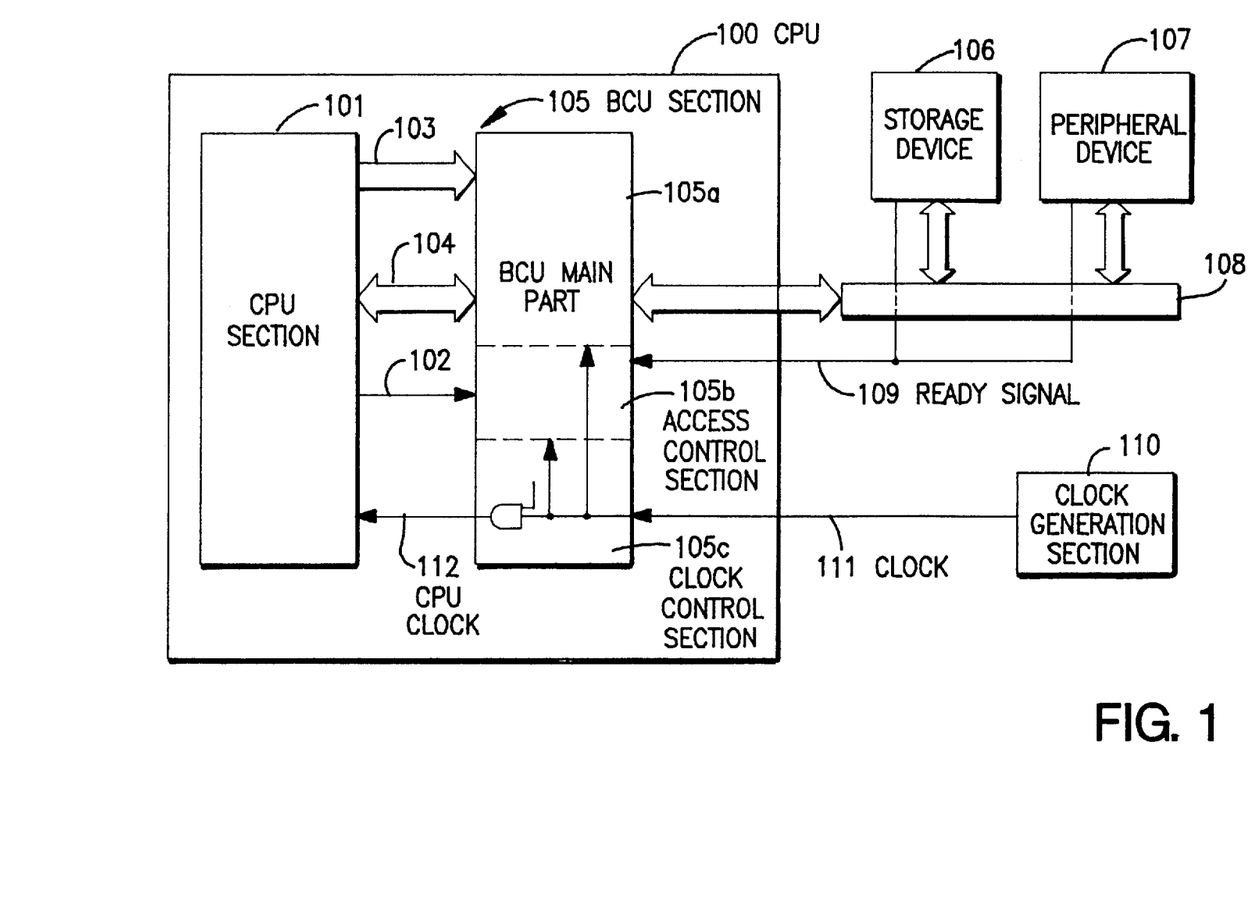
FIG. 1 is a block diagram of one embodiment of this invention.

FIG. 1 is a block diagram of one embodiment of this invention. In this figure, reference numeral 100 designates a CPU that is a processing apparatus to which this invention is applicable and that includes a CPU section 101 for operating on data and a BCU section 105 for controlling inputs and outputs of data between the CPU section 101 and an external storage device 106 or peripheral function 107.

The BCU section 105 is connected to the CPU section 101 via an internal bus comprising an internal address bus 103 and an internal data bus 104 and to the storage device 106 and the peripheral function 107 via an external bus 108 comprising an external data bus, an external address bus, and an external control bus. In this embodiment, the BCU section 105 has inside not only a BCU main part 105a and an access control section 105b which implement the basic functions of the BCU section but also a clock control section 105c to which a clock 111 generated by an externally installed clock generation section 110 is temporarily input and from which the clock is then supplied to the BCU main part 105a and the access control section 105b and also supplied to the CPU section 101 as a CPU clock 112. Ready signals 109 from the storage device 106 and the peripheral function 107 are input to the BCU section 105.

In the CPU 100 in FIG. 1, the CPU section 101 operates based on clock cycles each of which continues from the rising edge of the CPU clock 112 to its falling edge. When the CPU section 101 requires access to the storage device 106 or the peripheral function 107, it activates an access request signal 102 for a read or write access in synchronization with the rising edge of the CPU clock 112, and outputs to the internal address bus 103 the address of the device to be accessed in synchronization with the subsequent falling edge. During a read access, the CPU section receives data from the internal data bus 104 at the terminal of the subsequent clock cycle of the CPU clock 112 (that is, at the rising edge of the clock). That is, the CPU section 101 finishes a read access in two clock cycles. During a write access, it outputs data to the internal data bus 104 at the falling edge of the subsequent clock cycle of the CPU clock 112 to finish the write access. That is, the CPU section 101 also finishes a write access in two cycles.

The BCU section 105 activates a bus cycle in response to the access request signal 102 from the CPU section 101 and the address output to the internal address bus 103, and during a write access, outputs data on the internal data bus 104 to the external bus 108.

According to the bus cycle generated by the BCU section 105, during a read access, the storage device 106 and the peripheral function 107 output data to the external bus 108, while during a write access, they retrieve data from the external bus 108. During a write access, the ready signal 109 remains inactive, until the access ends.

The BCU section 105 has already sampled the state of the ready signal 109 during the bus cycle state, and provides wait control by generating wait states if the ready signal 109 remains inactive. Upon detecting that the ready signal 109 has become active, during a write access, the BCU section 105 ends the bus cycle, while during a read access, it retrieves the data output to the external bus 108 from the storage device 106 and the peripheral function 107 and then outputs it to the internal data bus 104 to end the bus cycle.

As described above, the CPU section 101 finishes a read access in two clock cycles, so the BCU section 105 must pass data to the CPU section 101 through the internal data bus 104 during the clock cycle subsequent to the clock cycle in which the CPU section 101 has output an access request signal 102 for a read access. Thus, when the CPU section 101 issues a read access request, the clock control section 105c in the BCU section 105 controls the CPU clock 112 so as to extend the clock cycle of the CPU section 101 to ensure the arrival of data. That is, the rising edge at the terminal of the clock cycle subsequent to the clock cycle in which the CPU section 101 has issued a read access request is delayed until the BCU section 105 outputs read data to the internal data bus 104.

Figure 2:
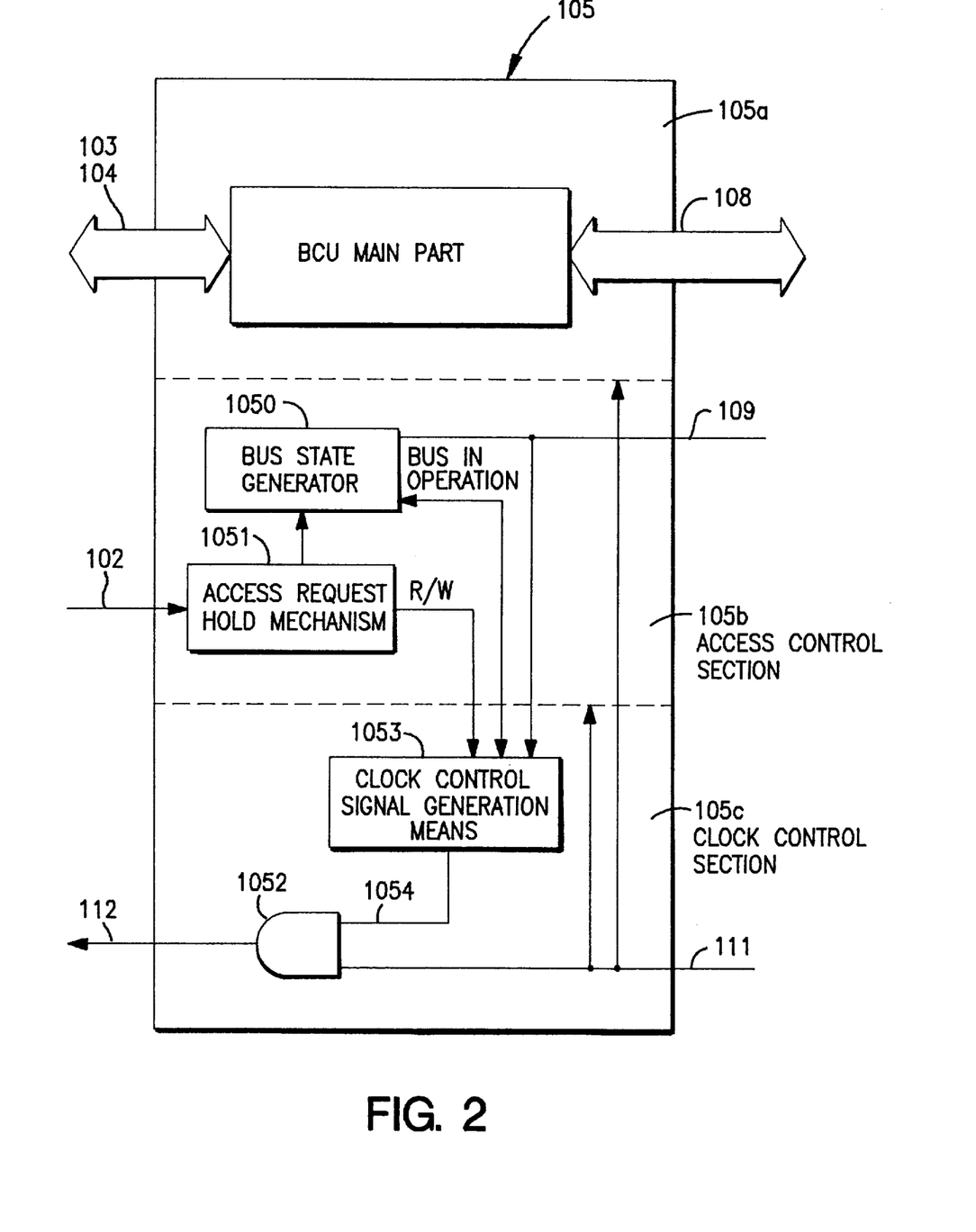
FIG. 2 is a block diagram of the BCU section of the embodiment in FIG. 1.
Figure 3A:
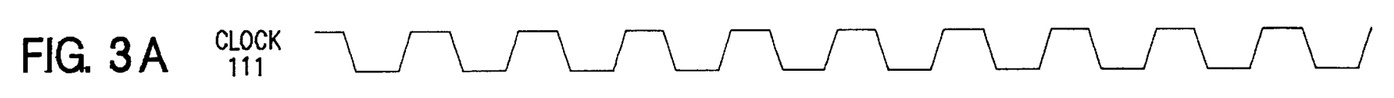
FIGS. 3A–3J are operation timing charts for the embodiment in FIG. 1.
Figure 3B:
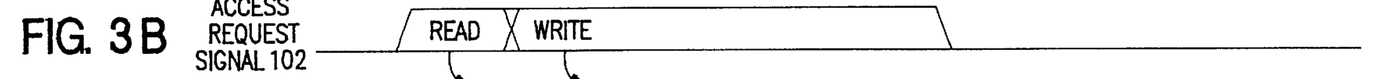
Figure 3C:
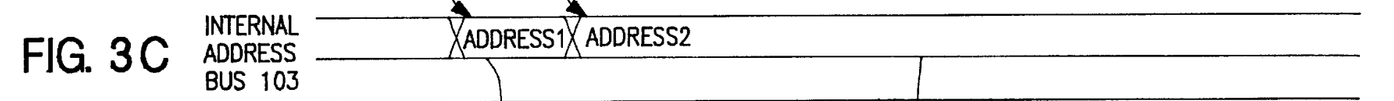
Figure 3D:
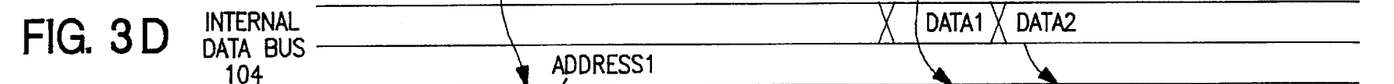
Figure 3E:
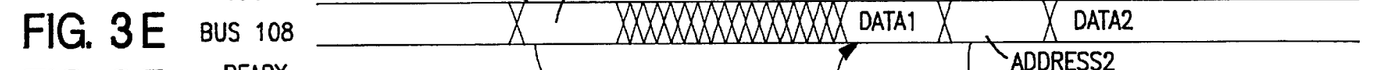
Figures 3F, 3G:
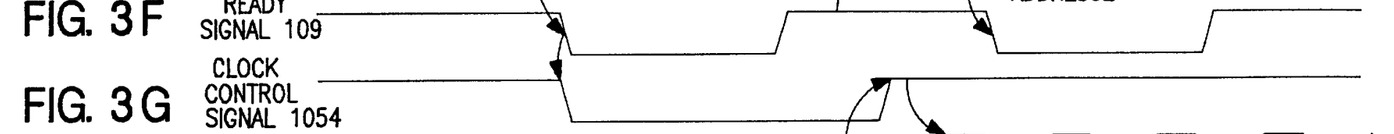
Figure 3H:
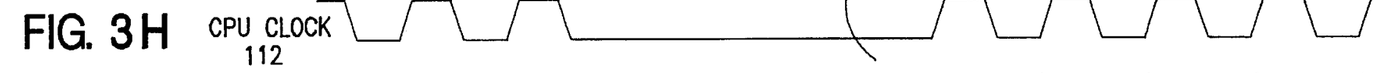
Figure 3I:
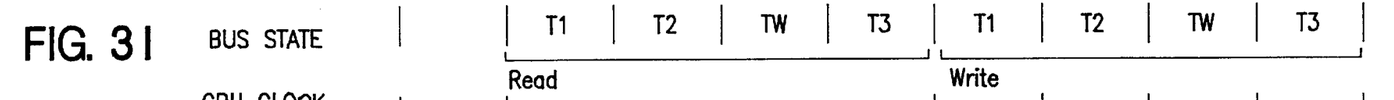
Figure 3J:
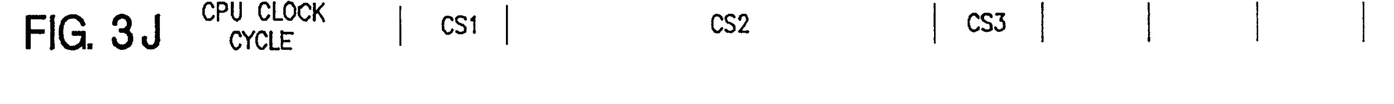

FIG. 2 is a block diagram of the BCU section 105 in FIG. 1. The BCU main part 105a is provided between the internal address and data buses 103 and 104 and the external bus 108, and mainly constitutes a data bus section and a prefetch control section such as a data latch, a I/O buffer, a prefetch mechanism, and aligner. The access control section 105b comprises an access request hold mechanism 1051 for accepting and retaining an access request from the CPU section 101 in FIG. 1 and a bus state generator 1050 for carrying out bus operations corresponding to the access request retained in the access request hold mechanism 1051.

The clock control section 105c comprises a clock control signal generation means 1053 and a gate 1052. If the access request retained in the access request hold mechanism 1051 is for a read access and the bus state generator 1050 indicates that the buses are operating, and when the ready signal 109 becomes inactive, then the clock control signal generation means 1053 inactivates a clock control signal 1054 to be output, and activates the clock control signal 1054 immediately before the end of the bus cycle. The gate 1052 shuts off the passage of the clock 111 while the clock control signal 1054 remains inactive.

FIGS. 3A–3J are operation timing charts in FIG. 1 in this invention. As shown in these figures, when the CPU section 101 outputs an access request for a read access in the form of the access request signal 102 during a CPU clock cycle CS1, and also outputs to the internal address bus 103 the address of a device to be read, the BCU section 105 activates a read bus cycle during the subsequent clock cycle. The BCU section 105 then generates wait states TW in response to the ready signal 109 from the device to be accessed, and when the ready signal 109 then becomes active, retrieves the data output by the accessed device to the external bus 108, and outputs it to the internal data bus 104 to end the read bus cycle. In this case, the read data is established on the internal data bus 104 during the fourth CPU clock cycle beyond the CPU clock cycle CS1 in which the CPU section 101 has output a read access request. The clock control section 105c thus extends the CPU clock cycle CS2 by delaying the rising edge of the CPU clock cycle CS2 subsequent to the CPU clock cycle CS1 in which the CPU section 101 has output a read access request until the read data has been established on the internal data bus 104.

In the example in FIG. 2, the CPU section 101 outputs a write access request after a read access request. The CPU section 101 outputs a write access request at the rising edge of the CPU clock cycle CS2 subsequent to the CPU clock cycle CS1 in which it has issued a read access request, and also outputs the address of a device to be accessed at the rising edge of the CPU clock cycle CS2. The bus cycle for this write access request is initiated immediately after the read bus cycle has been finished, as shown in the figure. During this write bus cycle, the BCU section 105 also generates wait states TW in response to the ready signal 109 from the device to be accessed, but in this case, the CPU clock 112 is still supplied as usual (different from) the read bus cycle.

Figure 4:
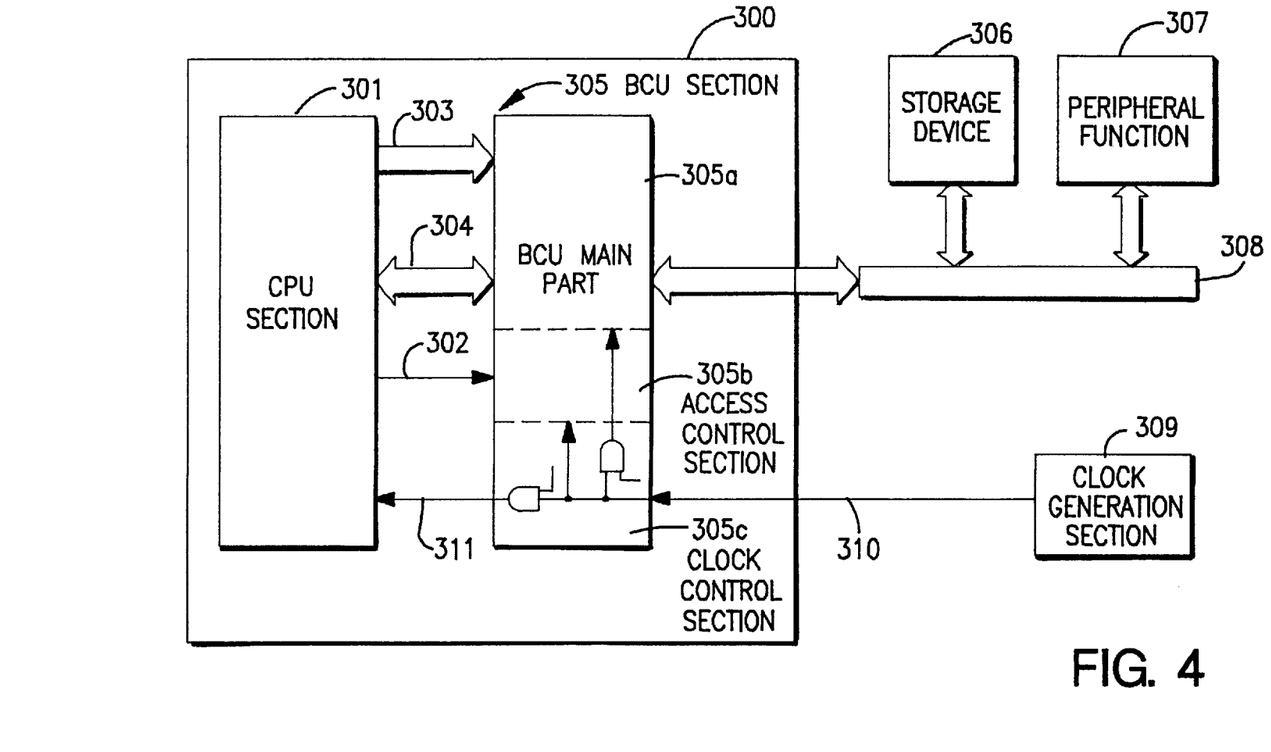
FIG. 4 is a block diagram of another embodiment of this invention.

FIG. 4 is a block diagram of another embodiment of this invention. This embodiment differs from the embodiment in FIG. 1 in that a clock control section 305c controls a CPU clock 311 as in the embodiment in FIG. 1 and also controls a clock supplied to a BCU main part 305a and that an access control section 305b provides wait control without depending on ready signals from external devices. Consequently, unlike the embodiment in FIG. 1, this embodiment does not involve ready signals from a storage device 306 or a peripheral function 307.

Figure 5:
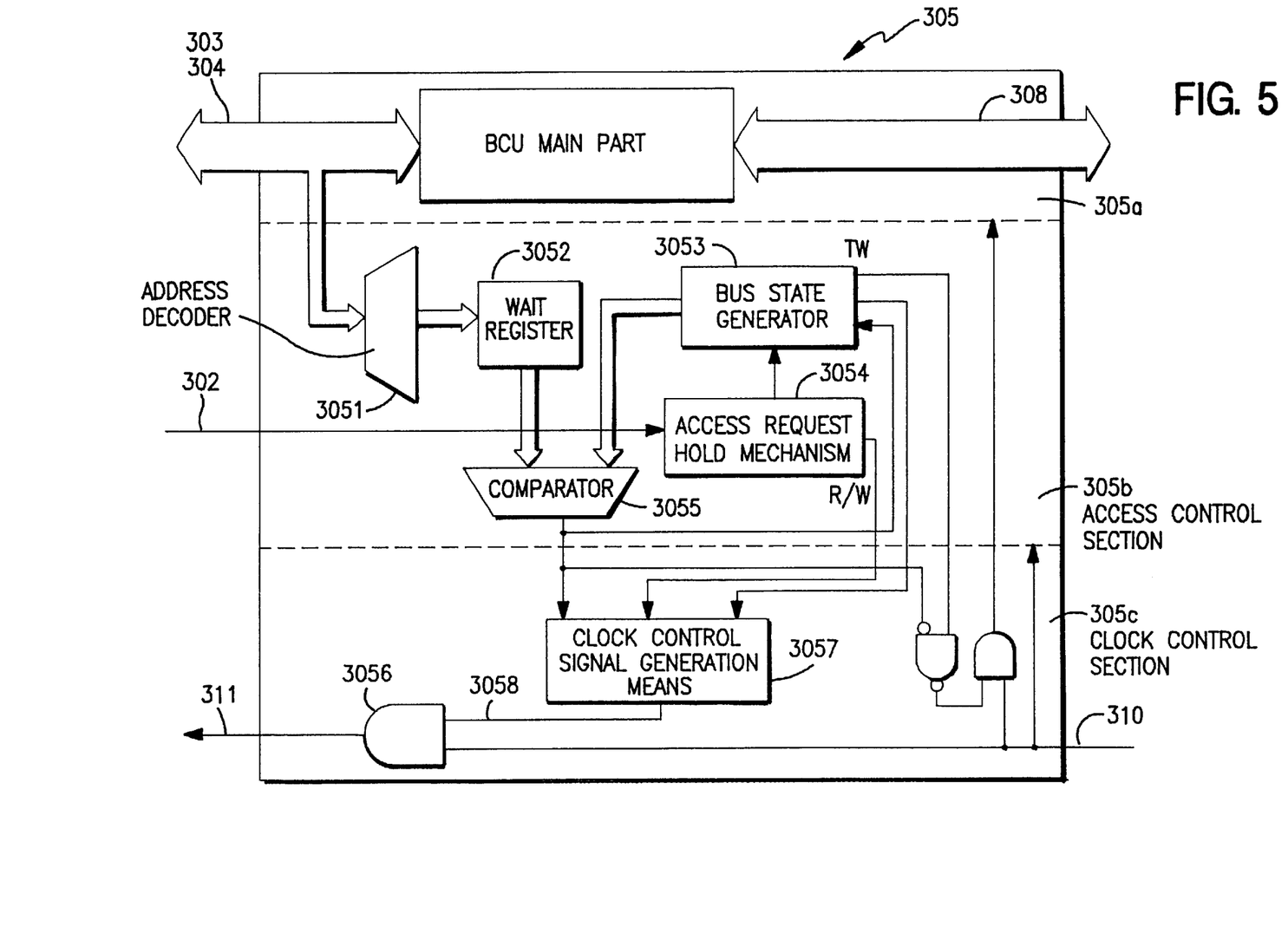
FIG. 5 is a block diagram of the BCU section of the embodiment in FIG. 4.

FIG. 5 is a block diagram of the BCU section 305 in FIG. 4. The BCU section 305 comprises a BCU main part 305a, an access control section 305b, and a clock control section 305c. The BCU main part 305a is the same as the BCU main part 105a in FIG. 1. In addition to a bus state generator 3053 and a an access request hold mechanism 3054 that are similar to the corresponding devices in FIG. 1, the access control section 305b includes an address decoder 3051, a wait register 3052, and a comparator 3055.

The wait register 3052 has the numbers of wait states corresponding to the access speeds of the storage device 306 and the peripheral function 307 registered with the addresses of these devices. When the address of an device to be accessed is output to the internal address bus 303, the address decoder 3051 that decodes the address reads the corresponding number of wait states from the wait register 3052, and places it at one input of the comparator 3055; a bus state count output by the bus state generator 3053 and indicating the number of bus states that have been executed including the current one is placed at the other output. The comparator 3055 compares these two values and outputs the result. The result output by the comparator 3055 is equivalent to the ready signal 109 in the embodiment in FIG. 1, and the bus state generator 3053 generates wait states during the bus cycle based on the result delivered from the comparator 3055.

The clock control section 305c comprises gates 3056, 3059, and 3061 and a clock control signal generation means 3057. As in the clock control signal generation means 1053 in FIG. 2, based on the result of the comparator 3055, the type of access request output by the access request retention mechanism 3054, and a bus operating signal output by the bus state generator 3053, if the access request is for a read access and the buses are operating and when the result of the comparator 3055 indicates a mismatch, then the clock control signal generation means 3057 inactivates a clock control signal 3058 to be output by itself, and activates the clock control signal 3058 immediately before the end of the bus cycle. While the clock control signal 3058 is inactive, the gate 3056 controls the CPU clock 311 by shutting off the passage of the clock 310.

The gate 3059 inactivates a clock control signal 3060 to be output by itself only during the period of time when the result of the comparator 3055 indicates a mismatch and when the bus state generator 3053 inputs a signal indicating a wait state period. While the clock control signal 3060 is inactive, the gate 3061 controls the clock 3062 for the BCU main part 305a by shutting off the passage of the clock 310.

The operation of the embodiment in FIG. 4 is explained below. The CPU section 301 operates based on clock cycles each of which continues from the rising edge of the CPU clock 311 to its falling edge. When the CPU section 301 requires an access to the storage device 306 or the peripheral function 307, it activates an access request signal 302 for a read or write access in synchronization with the rising edge of the CPU clock 311, and outputs to the internal address bus 303 the address of the device to be accessed in synchronization with the subsequent falling edge. During a read access, the CPU section receives data from the internal data bus 304 at the terminal of the subsequent clock cycle of the CPU clock 311 (that is, at the rising edge of the clock). That is, the CPU section 301 finishes a read access in two clock cycles. During a write access, it outputs data to the internal data bus 304 at the falling edge of the subsequent clock cycle of the CPU clock 311 to finish the write access. That is, the CPU section 301 also finishes a write access in two cycles.

The access control section 305b in the BCU section 305 activates a bus cycle in response to the access request signal 302 from the CPU section 301 and the address output to the internal address bus 303, and during a write cycle, outputs the data on the internal data bus 304 to the external bus 308.

According to the bus cycle generated by the BCU section 305, after a predetermined duration according to its processing speed expires, during a read access, the storage device 306 outputs data to the external bus 308, while during a write cycle, it retrieves data from the external bus 308, after a specified period of time has passed according to the processing speed of the storage device 306. Based on the bus cycle generated by the BCU section 305, during a read access, the peripheral function 307 also outputs data to the external bus 308, while during a write cycle, it retrieves data from the external bus 308, after a specified period of time has passed according to the processing speed of the peripheral function 307.

The wait register 3052 in the access control section 305b in the BCU section 305 has the numbers of wait states corresponding to the access speeds of the storage device 306 and the peripheral function 307 registered with the respective addresses of these devices. When The CPU section 301 outputs to the address bus 303 the address of an device to be read in making a read access request, the address decoder 3051 reads the corresponding number of wait states and outputs it to the comparator 3055 from the wait resister 3052. The comparator 3055 compares the number of wait states to a bus state count from the bus state generator 3053, and communicates the result to the bus state generator 3054. The bus state generator 3054 extends the bus operation until the result of comparison indicates a match. The clock control signal generation means 3057 in the clock control section 305c and the gate 3056 extends the low level of the CPU clock 311 during the clock cycle subsequent to the clock cycle in which the CPU section 301 has issued a read access request until the read data has been established on the internal data bus 304.

The gates 3059, 3061 in the clock control section 305c shut off the passage of the clock 3062 to the BCU main part 305a during wait states in the bus cycle generated by the access control section 305b. This serves to reduce the amount of power consumed by the BCU main part 305a during wait states.

When the wait states are over, the clock 3062 is supplied as usual, and the BCU main part 305a can resume its usual operation.

FIGS. 6A–6K are operation timing charts of the embodiment in FIG. 4. As shown in these figures, when the CPU section 301 outputs an access request for a read access to the access request signal 302 during the CPU clock cycle CS1, and also outputs to the internal address bus 303 the address of a device to be read, then the access control section 305b in the BCU section 305 activates a read bus cycle during the subsequent clock cycle. The BCU section 305 then generates wait states TW according to the access time of the device to be accessed, retrieves the data output by the accessed device to the external bus 308 during the state immediately after the wait states, and outputs it to the internal data bus 304 to end the read bus cycle. In this case, the read data is established during the fourth CPU clock cycle beyond the CPU clock cycle CS1 in which the CPU section 301 has output a read access request. The clock control section 305c thus extends the CPU clock cycle CS2 by delaying the rising edge of the CPU clock cycle CS2 subsequent to the CPU clock cycle CS1 in which the CPU section 101 has output a read access request until the read has been established on the internal data bus 304.

Figure 6A:
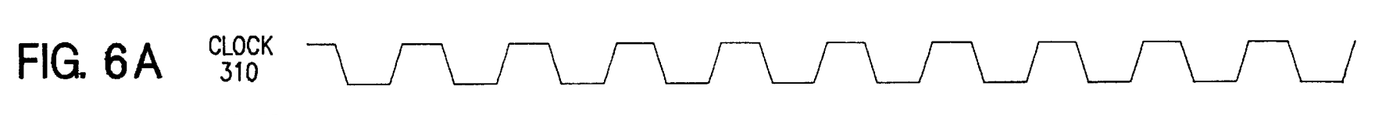
FIGS. 6A–6K are operation timing charts for the embodiment in FIG. 4.

The clock control section 305c stops the clock supplied to the BCU main part 305a during wait states TW in the read bus cycle.

Figure 6B:
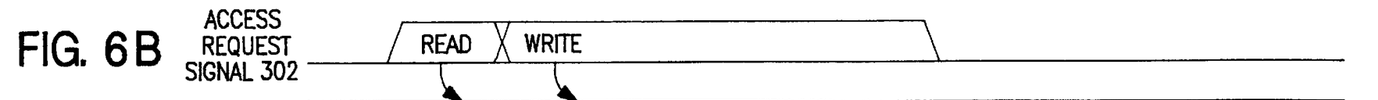
Figure 6C:
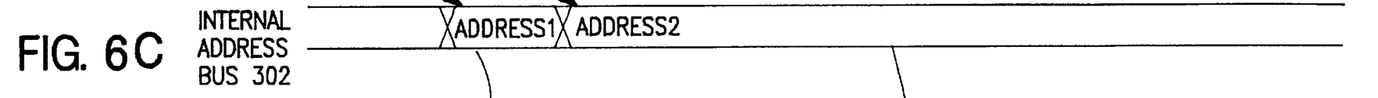
Figures 6D, 6E:
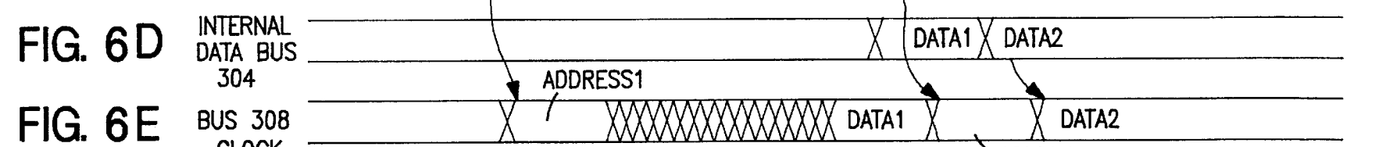
Figures 6F, 6G:
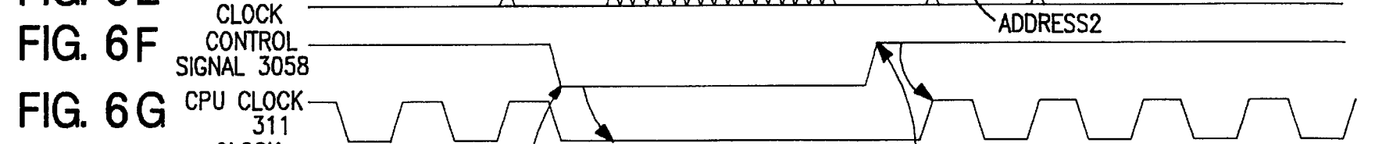
Figure 6H:
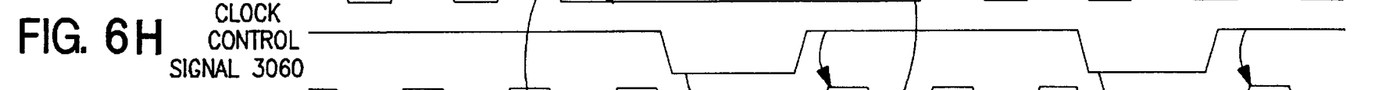
Figure 6I:
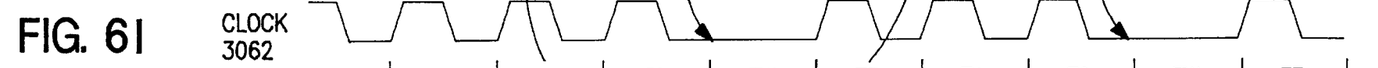

FIG. 6B shows an example in which the CPU section 301 outputs a write access request after a read access request. The CPU section 301 outputs a write access request at the rising edge of the CPU clock cycle CS2 subsequent to the CPU clock cycle CS1 in which it has issued a read access request, and also outputs the address of a device to be accessed at the rising edge of the CPU clock cycle CS2 to the internal address bus 303. The bus cycle for this write access request is initiated immediately after the read bus cycle has been finished, as shown in the figure. During this write bus cycle, the BCU main part 305a in the BCU section 305 also generates wait states TW, but the clock 3062 to the BCU main part 305a is stopped. The CPU clock 311, however, is still supplied as usual.

Figures 6J, 6K:
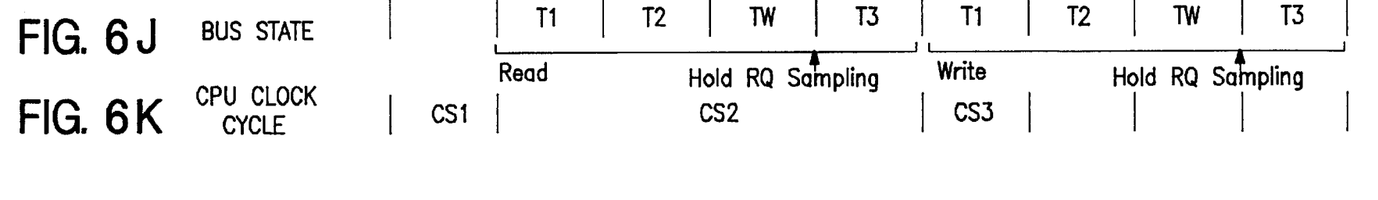

"Hold RQ Sampling" in FIG. 6J shows a bus surrender request. The bus surrender request is a signal input to the BCU section 305 when another external unit wishes to use the external bus 308. Upon receiving this signal, the BCU section 305 prevents a new bus cycle from occurring, disables an output buffer, and then outputs a surrender acknowledgement signal (Hold Ack). The bus surrender request is generally sampled one clock before a bus cycle has been ended, and one clock later when the bus clock is actually ended, the BCU section 305 prevents a subsequent bus cycle from being activated and outputs Hold Ack. In this invention, when the bus surrender request is sampled, the clock is being supplied to the BCU main part 305a. Thus, if the bus surrender request is detected during the first "Hold RQ sampling" in FIG. 6J, a bus cycle for the subsequent write cycle is prevented from occurring. That is, the delay of a response to the bus surrender request can be eliminated. On the contrary, in the prior art wherein the clock for the CPU is stopped, since the clock for the BCU section is stopped during the period of time corresponding to the "Hold RQ Sampling" in FIG. 6J, the BCU section cannot input Hold RQ and activates the subsequent bus cycle, thereby causing the delay of a response to the bus surrender request.

According to the above data processing apparatus according to this invention, the following effects can be produced.

When the CPU section issues a read access request, the clock for the CPU section is stopped until the BCU section outputs input data to the internal bus, thereby reducing the amount of power consumed by the CPU section. In view of the fact that the circuit of the CPU section is generally several times as large as the BCU section, the amount of power consumed by the overall CPU can be reduced.

When the CPU section issues a write access request, the clock is supplied to the CPU section as usual despite the operation of a device to be accessed, thereby preventing the processing speed of the CPU section from decreasing.

Since the BCU section continues operating even after the CPU section has been stopped, the delay of a response to the bus surrender request can be avoided.

In the prior art in FIG. 10 which allows both the CPU and BCU sections to have a wait function, the CPU and BCU sections are allowed to synchronize with each other by two-way signal control, so the synchronization control for the CPU section must be changed if its operations are to be changed. In this invention, however, the wait control function is not required in the CPU section, and only the clock cycle varies and the synchronization control for the CPU section need not be considered. As a result, the design of the CPU section need not be changed if the design of the BCU section is to be changed (for example, separation of an address data bus and incorporation of a cache). In addition, the number of gates can be reduced because the CPU section does not require the wait control function.

With the configuration in which the supply of the clock for the BCU main part is stopped during wait states in a bus cycle, the amount of power consumed by the CPU can further be reduced.

What is claimed is:

1. A data processing apparatus comprising:

a CPU coupled to a clock line for receiving a clock signal therethrough, said CPU for issuing a data read request;

a device subjected to a data read operation; and a BCU coupled between said CPU and said device for performing a data read bus cycle on said device in response to said data read request, said device responding to said data read bus cycle by performing a data read operation while generating a first control signal and returning read data to said BCU while generating a second control signal, said BCU including a clock control section which is inserted in series in said clock line, said clock control section responding to said first control signal to prevent said clock signal from being supplied to said CPU and responding to said second control signal to allow said clock signal to be supplied to said CPU, whereby at least one clock of said clock signal is not supplied to said CPU during a period from when said CPU issues said data read request to when said BCU receives said read data.

2. The apparatus according to claim 1, wherein said first control signal is represented by a first logic level of a ready signal from said device and said second control signal is represented by a second logic level of said ready signal.

3. A data processing apparatus comprising:

a CPU coupled to a clock line for receiving a clock signal therethrough, said CPU for issuing a data read request;

a device subjected to a data read operation; and a BCU coupled between said CPU and said device for performing a data read bus cycle on said device in response to said data read request, said device responding to said data read bus cycle by performing a data read operation and returning read data to said BCU, said BCU including a clock control circuit which is inserted in series in said clock line and responds to said data read request to prevent said clock signal from being supplied to said CPU for a predetermined period of time, and said BCU further including a register storing control data, said control data being read out of said register in response to said data read request and transferred to said clock control circuit to define at least one part of said predetermined period of time, whereby at least one clock of said clock signal is not supplied to said CPU during said predetermined period of time.

* * * * *